US012585402B2

(12) United States Patent
Hong

(10) Patent No.: US 12,585,402 B2
(45) Date of Patent: Mar. 24, 2026

(54) DATA PROCESSING METHOD AND APPARATUS, AND DEVICE TO ADJUST GARBAGE COLLECTION THRESHOLD

(71) Applicant: CLOUD INTELLIGENCE ASSETS HOLDING (SINGAPORE) PRIVATE LIMITED, Singapore (SG)

(72) Inventor: Yuandong Hong, Hangzhou (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 0 days.

(21) Appl. No.: 18/844,012

(22) PCT Filed: Apr. 10, 2023

(86) PCT No.: PCT/CN2023/087205
  § 371 (c)(1),
  (2) Date: Sep. 4, 2024

(87) PCT Pub. No.: WO2023/207562
  PCT Pub. Date: Nov. 2, 2023

(65) Prior Publication Data
  US 2025/0190136 A1      Jun. 12, 2025

(30) Foreign Application Priority Data
  Apr. 28, 2022    (CN) .......................... 202210470196.5

(51) Int. Cl.
  *G06F 3/06*            (2006.01)
(52) U.S. Cl.
  CPC .......... *G06F 3/0652* (2013.01); *G06F 3/0613* (2013.01); *G06F 3/0649* (2013.01); *G06F 3/068* (2013.01)

(58) Field of Classification Search
  CPC .... G06F 3/0652; G06F 3/0613; G06F 3/0649; G06F 3/068; G06F 2212/7206
  See application file for complete search history.

(56) References Cited

U.S. PATENT DOCUMENTS

2010/0146194 A1* 6/2010 Cheng ................. G06F 12/0246
                                                           711/E12.001
2014/0281129 A1* 9/2014 Heller ..................... G06F 3/068
                                                           711/162

(Continued)

FOREIGN PATENT DOCUMENTS

CN        109783020 A      5/2019
CN        110659217 A      1/2020

(Continued)

OTHER PUBLICATIONS

First Office Action dated May 16, 2024 for Chinese Patent Application No. 202210470196.5.

(Continued)

*Primary Examiner* — Chie Yew

(57)                ABSTRACT

Provided in the present application are a data processing method and apparatus, and a device. The method includes: acquiring target decision information corresponding to a capacity physical hard disk; determining a target time instant corresponding to a garbage collection operation based on the target decision information; performing the garbage collection operation on duplicated data in the capacity physical hard disk at the target time instant. Through the technical solution of the present application, the garbage collection operation can be performed at an appropriate time, which prevents the garbage collection operation from preempting a bandwidth of a data read operation, so that the capacity physical hard disk can meet a fast read/write need.

17 Claims, 3 Drawing Sheets

(56)             References Cited

U.S. PATENT DOCUMENTS

2017/0123688 A1      5/2017   Chen et al.
2017/0285971 A1     10/2017   Dai et al.
2018/0210828 A1      7/2018   Zhou et al.
2018/0276113 A1*     9/2018   Navon .................. G06F 3/0631
2019/0146679 A1      5/2019   Doh et al.
2019/0155726 A1*     5/2019   Bhatia ................. G06F 12/0246
2020/0293205 A1*     9/2020   Duval ................... G06F 3/0622
2021/0278990 A1*     9/2021   Choi ..................... G06F 3/0652

FOREIGN PATENT DOCUMENTS

CN            111158592  A      5/2020
CN            113253939  A      8/2021
CN            113971137  A      1/2022
CN            114281247  A      4/2022
CN            114895846  A      8/2022
WO      WO2016165441  A1     10/2016

OTHER PUBLICATIONS

International Search Report and Written Opinion dated Jul. 20, 2023
for International Application No. PCT/2023/087205.
Notification to Grant Patent Right for Invention dated Oct. 28, 2024
for Chinese Application No. 202210470196.5.

* cited by examiner

DATA PROCESSING METHOD AND APPARATUS, AND DEVICE TO ADJUST GARBAGE COLLECTION THRESHOLD

CROSS-REFERENCE TO RELATED APPLICATION

This application is a National Stage of International Application No. PCT/CN2023/087205, filed on Apr. 10, 2023, which claims priority to Chinese patent application No. 202210470196.5, filed with the China National Intellectual Property Administration on Apr. 28, 2022 and entitled "DATA PROCESSING METHOD AND APPARATUS, AND DEVICE". These applications are hereby incorporated by reference in their entireties.

TECHNICAL FIELD

The present application relates to the technical field of Internet and, in particular, to a data processing method and apparatus, and a device.

BACKGROUND

Cloud computing is a kind of distributed computing, which refers to that a data computation processing program is decomposed into many small programs over a network "cloud", and then these small programs are analyzed and processed by a system composed of a large number of servers, and after obtaining processing results, these results are returned to a user. The cloud computing has characteristics such as virtualization dynamic scalability, on-demand deployment, high flexibility, high reliability, high cost performance, scalability and so on.

With rapid development of cloud computing technology, a performance requirement on a physical hard disk is also increasing. In order to support the cloud computing technology, various types of physical hard disks may be used to store user data.

For example, there are two types of physical hard disks in the mainstream. The first type of physical hard disks has characteristics of fast read/write speed but small capacity. When this type of physical hard disks is used to store user data, a large-capacity storage need cannot be met. For example, in a cloud computing scenario, it is usually necessary to store a large quantity of user data, and these user data cannot be stored simultaneously in a physical hard disk.

The second type of physical hard disks has characteristics of large capacity but slow read/write speed, such as a QLC (Quad Level Cell) physical hard disk, etc. When this type of physical hard disks is used to store user data, a fast-read/write storage need cannot be met. For example, in a cloud computing scenario, it is usually necessary to fast write data and fast read data, and fast writing data and fast reading data cannot be supported in a physical hard disk.

SUMMARY

The present application provides a data processing method, applied to a storage device, where the storage device includes a high-speed physical hard disk and a capacity physical hard disk, user data is stored into the high-speed physical hard disk in an append manner, and when the high-speed physical hard disk meets a migration condition, the user data in the high-speed physical hard disk is migrated to the capacity physical hard disk in the append manner, the method including:

acquiring target decision information corresponding to the capacity physical hard disk;

determining a target time instant corresponding to a garbage collection operation based on the target decision information;

performing the garbage collection operation on duplicated data in the capacity physical hard disk at the target time instant.

Exemplarily, the determining the target time instant corresponding to the garbage collection operation based on the target decision information includes:

determining a target garbage collection threshold corresponding to the garbage collection operation based on the target decision information;

determining a time instant at which a data quantity of the duplicated data in the capacity physical hard disk reaches the target garbage collection threshold, and determining the time instant as the target time instant corresponding to the garbage collection operation.

Exemplarily, the target decision information includes a remaining storage space of the capacity physical hard disk; and the determining the target garbage collection threshold corresponding to the garbage collection operation based on the target decision information includes:

if the remaining storage space is less than a preset first storage space threshold, reducing an initial garbage collection threshold configured, to obtain the target garbage collection threshold; or if the remaining storage space is greater than a preset second storage space threshold, increasing an initial garbage collection threshold configured, to obtain the target garbage collection threshold; or if the remaining storage space is not less than a preset first storage space threshold and is not greater than a preset second storage space threshold, determining an initial garbage collection threshold as the target garbage collection threshold.

Exemplarily, the target decision information includes a garbage ratio of the capacity physical hard disk, the garbage ratio representing a ratio of the data quantity of the duplicated data to a total data quantity; and the determining the target garbage collection threshold corresponding to the garbage collection operation based on the target decision information includes:

if the garbage ratio is less than a preset first garbage ratio threshold, increasing an initial garbage collection threshold configured, to obtain the target garbage collection threshold; or if the garbage ratio is greater than a preset second garbage ratio threshold, reducing an initial garbage collection threshold configured, to obtain the target garbage collection threshold; or if the garbage ratio is not less than a preset first garbage ratio threshold and is not greater than a preset second garbage ratio threshold, determining an initial garbage collection threshold as the target garbage collection threshold.

Exemplarily, a statistical cycle is divided into a plurality of time periods, and the target decision information includes a total input/output (IO) quantity corresponding to each time period; for a total IO quantity corresponding to each time period, the total IO quantity is, in the time period, a sum of a write operation quantity and a read operation quantity for the high-speed physical hard disk, and a read operation quantity for the capacity physical hard disk;

the determining the target time instant corresponding to the garbage collection operation based on the target decision information includes:

for each time period comprising a first time period, if the total IO quantity corresponding to the first time period is greater than a preset IO quantity threshold, determining the target time instant corresponding to the garbage collection operation based on the first time period;

where the target time instant is before a start time instant of the time period.

Exemplarily, when the high-speed physical hard disk meets the migration condition, the user data in the high-speed physical hard disk being migrated to the capacity physical hard disk in the append manner includes:

hotspot data distribution information corresponding to the high-speed physical hard disk being acquired;

a target migration threshold corresponding to a migration operation being determined based on the hotspot data distribution information;

when a data quantity of the user data in the high-speed physical hard disk reaches the target migration threshold, it being determined that the high-speed physical hard disk meets the migration condition, and the user data in the high-speed physical hard disk being migrated to the capacity physical hard disk in the append manner.

Exemplarily, the hotspot data distribution information includes a total hotspot data quantity, and the total hotspot data quantity is a sum of a hotspot data quantity in the high-speed physical hard disk and a hotspot data quantity in the capacity physical hard disk; the target migration threshold corresponding to the migration operation being determined based on the hotspot data distribution information includes: if the total hotspot data quantity is greater than a preset first quantity threshold, an initial migration threshold configured being increased to obtain the target migration threshold; or if the total hotspot data quantity is less than a preset second quantity threshold, an initial migration threshold configured being reduced to obtain the target migration threshold; or if the total hotspot data quantity is not greater than a preset first quantity threshold and is not less than a preset second quantity threshold, an initial migration threshold being determined as the target migration threshold.

Exemplarily, the performing the garbage collection operation on the duplicated data in the capacity physical hard disk at the target time instant includes: determining a band in which the duplicated data in the capacity physical hard disk is located, where the band includes multiple storage blocks, and the multiple storage blocks include a storage block with the duplicated data;

if the multiple storage blocks further include a target storage block without the duplicated data, storing the user data within the target storage block into the capacity physical hard disk in the append manner;

deleting the user data within each storage block in the band.

Exemplarily, the storage device stores the user data with use of a write shaping cache (WSC) architecture;

read/write speed of the high-speed physical hard disk is greater than a preset speed threshold, and storage capacity of the high-speed physical hard disk is less than a preset capacity threshold; read/write speed of the capacity physical hard disk is not greater than the preset speed threshold, and storage capacity of the capacity physical hard disk is not less than the preset capacity threshold.

The present application provides a data processing apparatus, applied to a storage device, where the storage device includes a high-speed physical hard disk and a capacity physical hard disk, the apparatus including:

a storing module, configured to store, after obtaining user data, the user data into the high-speed physical hard disk in an append manner; and migrate, when the high-speed physical hard disk meets a migration condition, the user data in the high-speed physical hard disk to the capacity physical hard disk in the append manner;

an acquiring module, configured to acquire target decision information corresponding to the capacity physical hard disk;

a determining module, configured to determine a target time instant corresponding to a garbage collection operation based on the target decision information;

a processing module, configured to perform the garbage collection operation on duplicated data in the capacity physical hard disk at the target time instant.

Exemplarily, the determining module, when determining the target time instant corresponding to the garbage collection operation based on the target decision information, is specifically configured to: determine a target garbage collection threshold corresponding to the garbage collection operation based on the target decision information; determine a time instant at which a data quantity of the duplicated data in the capacity physical hard disk reaches the target garbage collection threshold, and determine the time instant as the target time instant corresponding to the garbage collection operation;

where the target decision information includes a remaining storage space of the capacity physical hard disk; the determining module, when determining the target garbage collection threshold corresponding to the garbage collection operation based on the target decision information, is specifically configured to: if the remaining storage space is less than a preset first storage space threshold, reduce an initial garbage collection threshold configured, to obtain the target garbage collection threshold; or if the remaining storage space is greater than a preset second storage space threshold, increase an initial garbage collection threshold, to obtain the target garbage collection threshold; or if the remaining storage space is not less than a preset first storage space threshold and is not greater than a preset second storage space threshold, determine an initial garbage collection threshold as the target garbage collection threshold;

where the target decision information includes a garbage ratio of the capacity physical hard disk, the garbage ratio representing a ratio of the data quantity of the duplicated data to a total data quantity; the determining module, when determining the target garbage collection threshold corresponding to the garbage collection operation based on the target decision information, is specifically configured to: if the garbage ratio is less than a preset first garbage ratio threshold, increase an initial garbage collection threshold configured, to obtain the target garbage collection threshold; or if the garbage ratio is greater than a preset second garbage ratio threshold, reduce an initial garbage collection threshold, to obtain the target garbage collection threshold; or if the garbage ratio is not less than a preset first garbage ratio threshold and is not greater than a preset second garbage ratio threshold, determine an initial garbage collection threshold as the target garbage collection threshold.

Exemplarily, a statistical cycle is divided into a plurality of time periods, and the target decision information includes a total input/output (IO) quantity corresponding to each time period; for a total IO quantity corresponding to each time period, the total IO quantity is, in the time period, a sum of a write operation quantity and a read operation quantity for the high-speed physical hard disk, and a read operation quantity for the capacity physical hard disk; the determining module, when determining the target time instant corresponding to the garbage collection operation based on the target decision information, is specifically configured to: for each time period comprising a first time period, if the total IO quantity corresponding to the first time period is greater than a preset IO quantity threshold, determine the target time instant corresponding to the garbage collection operation based on the first time period.

Exemplarily, the storing module, when migrating, when the high-speed physical hard disk meets a migration condition, the user data in the high-speed physical hard disk to the capacity physical hard disk in the append manner, is specifically configured to: acquire hotspot data distribution information corresponding to the high-speed physical hard disk; determine a target migration threshold corresponding to a migration operation based on the hotspot data distribution information; when a data quantity of the user data in the high-speed physical hard disk reaches the target migration threshold, determine that the high-speed physical hard disk meets the migration condition, and migrate the user data in the high-speed physical hard disk to the capacity physical hard disk in the append manner;

where the hotspot data distribution information includes a total hotspot data quantity, and the total hotspot data quantity is a sum of a hotspot data quantity in the high-speed physical hard disk and a hotspot data quantity in the capacity physical hard disk; the storing module, when determining the target migration threshold corresponding to the migration operation based on the hotspot data distribution information, is specifically configured to: if the total hotspot data quantity is greater than a preset first quantity threshold, increase an initial migration threshold configured, to obtain the target migration threshold; or if the total hotspot data quantity is less than a preset second quantity threshold, reduce an initial migration threshold configured, to obtain the target migration threshold; or if the total hotspot data quantity is not greater than a preset first quantity threshold and is not less than a preset second quantity threshold, determine an initial migration threshold as the target migration threshold.

Exemplarily, the processing module, when performing the garbage collection operation on the duplicated data in the capacity physical hard disk at the target time instant, is specifically configured to: determine a band in which the duplicated data in the capacity physical hard disk is located, where the band includes multiple storage blocks, and the multiple storage blocks include a storage block with the duplicated data; if the multiple storage blocks further include a target storage block without the duplicated data, store the user data within the target storage block into the capacity physical hard disk in the append manner; delete the user data within each storage block in the band.

The present application provides a storage device, including: a processor and a machine-readable storage medium, where the machine-readable storage medium stores machine-executable instructions that can be executed by the processor; and the processor is configured to execute the machine-executable instructions to implement the data processing method disclosed in the foregoing examples of the present application.

The present application provides a machine-readable storage medium storing machine-executable instructions that can be executed by a processor, where the processor is configured to execute the machine-executable instructions to implement the data processing method disclosed in the foregoing examples of the present application.

It can be seen from the above technical solutions that, in an embodiment of the present application, a storage device includes a high-speed physical hard disk and a capacity physical hard disk, where the high-speed physical hard disk is a physical hard disk with fast read/write speed but small capacity, and the capacity physical hard disk is a physical hard disk with large capacity but slow read/write speed. In case of storage of user data, the user data is stored into the high-speed physical hard disk in an append manner, thereby meeting a fast-read/write storage need, that is, fast writing data and fast reading data can be supported. When the high-speed physical hard disk meets a migration condition, the user data in the high-speed physical hard disk is migrated to the capacity physical hard disk in the append manner, thereby meeting a large-capacity storage need, that is, a large quantity of user data can be stored at the same time through the capacity physical hard disk. A target time instant corresponding to a garbage collection operation can be determined, and the garbage collection operation can be performed on duplicated data in the capacity physical hard disk at the target time instant, so that the garbage collection operation can be performed at an appropriate time, which prevents the garbage collection operation from preempting a bandwidth of a data read operation, so that the capacity physical hard disk can meet a fast read/write need, rendering that a product need regarding a user read traffic can be met, avoiding the problem of traffic occupation and data loss caused by insufficient storage space, and ensuring that a user requirement is met in a high-traffic read-write mixed scenario, so that the storage device is in a stable state of dynamic balance.

DESCRIPTION OF EMBODIMENTS

Figure 1:
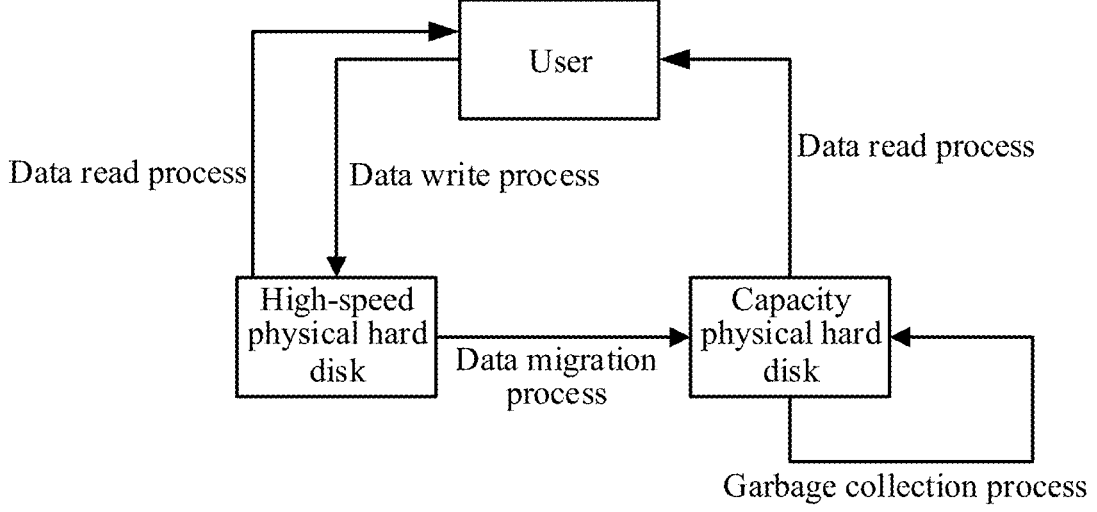
FIG. 1 is a schematic diagram of a data write process and a data read process in an implementation of the present application.

A term used in an embodiment of the present application is only for the purpose of describing a specific embodiment, rather than limiting the present application. Words "a/an", "the", and "said" in singular form used in the present application and the claims are intended to include plural form as well, unless the context clearly indicates otherwise. It should also be understood that the term "and/or" used herein refers to any or all possible combinations including one or more associated listed items.

It should be understood that although various information may be described using terms such as "first", "second", and "third" in embodiments of the present application, the information should not be limited to these terms. These terms are only used to distinguish the same type of information from each other. For example, without departing from the scope of the present application, first information may also be referred to as second information, and similarly, second information may also be referred to as first information. Further, depending on the context, the used word "if" may be interpreted as "at the time of" or "when" or "in response to determining".

With rapid development of cloud computing technology, a performance requirement on a physical hard disk is also increasing. In order to support the cloud computing technology, various types of physical hard disks may be used to store user data. In order to meet a need of low latency and high throughput, an embodiment of the present application proposes a solution for storing user data by using a WSC (Write Shaping Cache) architecture. The WSC architecture is a cache technology.

In an embodiment of the present application, a storage device includes a high-speed physical hard disk and a capacity physical hard disk, and the storage device uses the WSC architecture to store user data, that is, the high-speed physical hard disk and the capacity physical hard disk are used to store the user data. When the high-speed physical hard disk and the capacity physical hard disk are used to store the user data, the high-speed physical hard disk is used as a cache of the capacity physical hard disk to accelerate read/write speed of the capacity physical hard disk.

Here, the high-speed physical hard disk is a physical hard disk with fast read/write speed and small capacity, and has characteristics of fast read/write speed but small capacity. The high-speed physical hard disk uses an ultra-high-speed memory technology to implement data storage, and the type of the high-speed physical hard disk is not limited in the embodiment, as long as it has the characteristics of fast read/write speed but small capacity.

For example, the read/write speed of the high-speed physical hard disk is greater than a preset speed threshold, and the storage capacity of the high-speed physical hard disk is less than a preset capacity threshold. The preset speed threshold may be configured according to experience, and when the read/write speed of the high-speed physical hard disk is greater than the preset speed threshold, it means that the read/write speed is fast. The preset capacity threshold may be configured according to experience, and when the storage capacity of the high-speed physical hard disk is less than the preset capacity threshold, it means that the capacity is small.

Here, the capacity physical hard disk is a physical hard disk with slow read/write speed and large capacity, and has characteristics of large capacity but slow read/write speed, such as a QLC physical hard disk, etc. The QLC physical hard disk is a large capacity SSD (Solid State Disk), and the QLC physical hard disk has a voltage which may vary in total of 16 kinds from 0000 to 1111. Of course, the QLC physical hard disk is only an example of the capacity physical hard disk. The type of the capacity physical hard disk is not limited in the embodiment, as long as it has the characteristics of large capacity but slow read/write speed.

For example, the read/write speed of the capacity physical hard disk is not greater than a preset speed threshold, and the storage capacity of the capacity physical hard disk is not less than a preset capacity threshold. The preset speed threshold is configured according to experience, and when the read/write speed of the capacity physical hard disk is not greater than the preset speed threshold, it means that the read/write speed is slow. The preset capacity threshold is configured according to experience, and when the storage capacity of the capacity physical hard disk is not less than the preset capacity threshold, it means that the capacity is large.

Reference is made to FIG. 1, which is a schematic diagram of a data write process and a data read process in the WSC architecture.

Regarding the data write process, user data is stored into a high-speed physical hard disk in an append manner, that is, the user data is additionally written after written data of the high-speed physical hard disk. When the high-speed physical hard disk meets a migration condition, the user data in the high-speed physical hard disk may be migrated to a capacity physical hard disk in an append manner, that is, the user data is additionally written after written data of the capacity physical hard disk.

For example, for user data A to be written, the user data A may be stored into the high-speed physical hard disk in the append manner, and a physical address of the user data A in the high-speed physical hard disk is determined, recorded as physical address A1, and a logical address corresponding to the user data A is determined, recorded as logical address A2.

Exemplarily, an L2P (Logical to Physical) table can be stored, e.g., storing the L2P table in a memory, and persisting the L2P table to a certain sector of the high-speed physical hard disk. The L2P table is used to record a mapping relationship between a logical address and physical address. On this basis, for the user data A, the mapping relationship between the logical address A2 and the physical address A1 may be recorded in the L2P table, as shown in Table 1.

For another example, for user data B to be written, the user data B may be stored into the high-speed physical hard disk in the append manner, a physical address B1 of the user data B in the high-speed physical hard disk is determined, a logical address B2 corresponding to the user data B is determined, and a mapping relationship between the logical address B2 and the physical address B1 is recorded in the L2P table, and so on. Hence, each piece of user data can be stored into the high-speed physical hard disk.

TABLE 1

| Logical Address | Physical Address |
| --- | --- |
| A2 | A1 |
| B2 | B1 |
| . . . | . . . |

In a possible implementation, an initial migration threshold may be configured for the high-speed physical hard disk. When a data quantity of the user data in the high-speed physical hard disk reaches the initial migration threshold, it is determined that the high-speed physical hard disk meets the migration condition, and the user data in the high-speed physical hard disk (which may be all or part of the user data in the high-speed physical hard disk) is migrated to the capacity physical hard disk in the append manner.

For example, an initial migration threshold m1 may be configured in advance, and the initial migration threshold m1 may be configured according to experience, which is not limited, and the initial migration threshold m1 is used to represent a data quantity threshold. For each piece of user data, after storing the user data into the high-speed physical hard disk, it is determined whether a data quantity of the user data in the high-speed physical hard disk reaches the initial migration threshold m1: if no, proceed with storage of new user data into the high-speed physical hard disk; if yes, the user data in the high-speed physical hard disk is migrated to the capacity physical hard disk in an append manner, and the migrated user data is deleted from the high-speed physical hard disk, and for new user data, proceed with storage of the new user data into the high-speed physical hard disk.

Here, after the user data in the high-speed physical hard disk is migrated to the capacity physical hard disk, it is also necessary to determine a physical address of the user data in the capacity physical hard disk. For example, the user data A corresponds to the physical address A3 in the capacity physical hard disk, the user data B corresponds to the physical address B3 in the capacity physical hard disk, and so on.

On this basis, the physical address in the high-speed physical hard disk in the L2P table may further be updated to the physical address in the capacity physical hard disk, as shown in Table 2, which is an example of an updated L2P table.

TABLE 2

| Logical Address | Physical Address |
| --- | --- |
| A2 | A3 |
| B2 | B3 |
| . . . | . . . |

Here, when the user data in the high-speed physical hard disk is migrated to the capacity physical hard disk in the append manner, a deduplication operation may be performed on the user data in the high-speed physical hard disk, and user data after the deduplication operation is migrated to the capacity physical hard disk. For example, since the user data is stored into the high-speed physical hard disk in the append manner, there may be multiple pieces of duplicated user data in the high-speed physical hard disk, that is, duplicated user data generated at different time instants. For the duplicated user data, during data migration, a deduplication operation may be performed on the duplicated user data, and user data after the deduplication operation is migrated to the capacity physical hard disk. For example, the last piece of user data is migrated to the capacity physical hard disk, and the user data is deleted from the high-speed physical hard disk, and the remaining user data is directly deleted from the high-speed physical hard disk and is no longer migrated to the capacity physical hard disk.

Here, when the user data in the high-speed physical hard disk is migrated to the capacity physical hard disk in the append manner, the user data in the high-speed physical hard disk may be migrated to the capacity physical hard disk based on a granularity of a band (storage block area). Referring to FIG. 1, the band may include multiple storage blocks. When user data migration is performed, multiple pieces of user data are migrated to the multiple storage blocks in the band at one time.

Regarding the data read process, a logical address corresponding to user data may be determined, an L2P table is queried through the logical address to obtain a physical address corresponding to the user data, and the user data is read based on the physical address. For example, the user data may be read from the high-speed physical hard disk based on the physical address, or the user data may be read from the capacity physical hard disk based on the physical address. For example, for user data A, logical address A2 corresponding to the user data A is determined, and an L2P table is queried through the logical address A2. If the user data A is currently in the high-speed physical hard disk, reference is made to Table 1 for the L2P table. The physical address A1 is queried from the L2P table, and the user data A corresponding to the physical address A1 is read from the high-speed physical hard disk. If the user data A is currently in the capacity physical hard disk, reference is made to Table 2 for the L2P table. The physical address A3 is queried from the L2P table, and the user data A corresponding to the physical address A3 is read from the capacity physical hard disk.

In a possible implementation, since the user data in the high-speed physical hard disk is migrated to the capacity physical hard disk in the append manner, multiple pieces of duplicated user data may be migrated to the capacity physical hard disk in multiple migration processes, that is, there may be multiple pieces of duplicated user data in the capacity physical hard disk, that is, duplicated user data generated at different time instants. In order to save storage resources of the capacity physical hard disk, a GC (Garbage Collection) operation may be performed on the capacity physical hard disk, that is, a deduplication operation is performed on the duplicated user data in the capacity physical hard disk, user data after the deduplication operation is retained in the capacity physical hard disk, and remaining user data is deleted from the capacity physical hard disk. For example, the last piece of user data may be retained in the capacity physical hard disk, and the remaining user data is deleted from the capacity physical hard disk.

For a garbage collection process, garbage collection operations are usually performed on the capacity physical hard disk at regular intervals. For example, garbage collection operations are performed on the capacity physical hard disk every 10 hours, to complete data deduplication.

In summary, the data operation in connection with the capacity physical hard disk involves three aspects: migrating user data in the high-speed physical hard disk to the capacity physical hard disk (denoted as a data write operation), reading user data from the capacity physical hard disk (denoted as a data read operation), and performing a garbage collection operation on duplicated user data in the capacity physical hard disk (denoted as garbage collection operation). Since a total bandwidth of the capacity physical hard disk remains unchanged, the data write operation, the data read operation, and the garbage collection operation jointly occupy the total bandwidth of the capacity physical hard disk.

Obviously, when the garbage collection operation and the data read operation are performed simultaneously, the larger a bandwidth occupied by the garbage collection operation is, the smaller a bandwidth occupied by the data read operation is. That is, the garbage collection operation may affect the bandwidth occupied by the data read operation, so that the bandwidth occupied by the data read operation is greatly reduced, which may not meet a need of the data read operation, that is, the data read operation cannot be completed in time, and the user data cannot be returned to a user in time.

In view of the above problem, in an embodiment of the present application, a target time instant corresponding to the garbage collection operation can be determined, and the garbage collection operation can be performed on duplicated data in the capacity physical hard disk at the target time instant, so that the garbage collection operation can be performed at an appropriate time, which prevents the garbage collection operation from preempting the bandwidth of the data read operation, so that the capacity physical hard disk can meet the need of the data read operation, the data read operation can be completed in time, and the user data can be returned to the user in time, rendering that a product need regarding a user read traffic can be met, and ensuring that a user requirement is met in a high-traffic read-write mixed scenario, so that the garbage collection operation and the data read operation do not affect each other.

The following describes the technical solutions of the embodiments of the present application with reference to specific embodiments.

Figure 2:
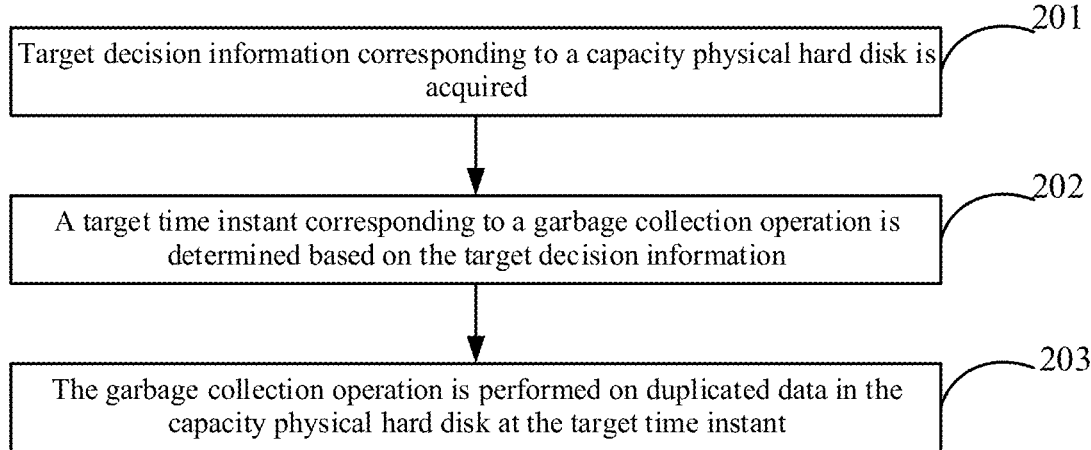
FIG. 2 is a schematic flow diagram of a data processing method in an implementation of the present application.

A data processing method is provided in an embodiment of the present application, which may be applied to a storage device, where the storage device may include a high-speed physical hard disk and a capacity physical hard disk, where the high-speed physical hard disk is a physical hard disk with fast read/write speed and small capacity, and the capacity physical hard disk is a physical hard disk with slow read/write speed and large capacity. Here, user data is stored into the high-speed physical hard disk in an append manner, and when the high-speed physical hard disk meets a migration condition, the user data in the high-speed physical hard disk is migrated to the capacity physical hard disk in the append manner. In the above application scenario, reference is made to FIG. 2, which is a schematic flow diagram of a data processing method. The method may include the following steps.

At step 201, target decision information corresponding to the capacity physical hard disk is acquired.

At step 202, a target time instant corresponding to a garbage collection operation is determined based on the target decision information.

At step 203, the garbage collection operation is performed on duplicated data in the capacity physical hard disk at the target time instant.

In a possible implementation, the determining the target time instant corresponding to the garbage collection operation based on the target decision information may include, but is not limited to: determining a target garbage collection threshold corresponding to the garbage collection operation based on the target decision information; determining a time instant at which a data quantity of the duplicated data in the capacity physical hard disk reaches the target garbage collection threshold, and determining the time instant as the target time instant corresponding to the garbage collection operation.

Exemplarily, when determining the target garbage collection threshold corresponding to the garbage collection operation based on the target decision information, the target decision information may include a remaining storage space of the capacity physical hard disk. If the remaining storage space is less than a preset first storage space threshold, reducing an initial garbage collection threshold configured (which may be configured according to experience and is not limited thereto), to obtain the target garbage collection threshold; or if the remaining storage space is greater than a preset second storage space threshold, increasing an initial garbage collection threshold, to obtain the target garbage collection threshold; or if the remaining storage space is not less than a preset first storage space threshold and is not greater than a preset second storage space threshold, determining an initial garbage collection threshold as the target garbage collection threshold.

Exemplarily, when determining the target garbage collection threshold corresponding to the garbage collection operation based on the target decision information, the target decision information may include a garbage ratio of the capacity physical hard disk, and the garbage ratio is used to represent a ratio of the data quantity of the duplicated data to a total data quantity. On this basis, if the garbage ratio is less than a preset first garbage ratio threshold, increasing an initial garbage collection threshold configured, to obtain the target garbage collection threshold; or if the garbage ratio is greater than a preset second garbage ratio threshold, reducing an initial garbage collection threshold, to obtain the target garbage collection threshold; or if the garbage ratio is not less than a preset first garbage ratio threshold and is not greater than a preset second garbage ratio threshold, determining an initial garbage collection threshold as the target garbage collection threshold.

In another possible implementation, a statistical cycle is divided into a plurality of time periods, and the target decision information may include a total IO quantity corresponding to each time period; for a total IO quantity corresponding to each time period, the total IO quantity is, in the time period, a sum of a write operation quantity and a read operation quantity for the high-speed physical hard disk, and a read operation quantity for the capacity physical hard disk. On this basis, the determining the target time instant corresponding to the garbage collection operation based on the target decision information may include, but is not limited to: based on a total IO quantity corresponding to each time period, if the total IO quantity corresponding to the time period is greater than a preset IO quantity threshold, determining the target time instant corresponding to the garbage collection operation based on the time period, where the target time instant is before a start time instant of the time period.

In a possible implementation, when the high-speed physical hard disk meets the migration condition, the user data in the high-speed physical hard disk being migrated to the capacity physical hard disk in the append manner may include, but is not limited to, the following manner: hotspot data distribution information corresponding to the high-speed physical hard disk being acquired, and a target migration threshold corresponding to a migration operation being determined based on the hotspot data distribution information; on this basis, when a data quantity of the user data in the high-speed physical hard disk reaches the target migration threshold, it being determined that the high-speed physical hard disk meets the migration condition, and the user data in the high-speed physical hard disk being migrated to the capacity physical hard disk in the append manner.

Exemplarily, the hotspot data distribution information may include a total hotspot data quantity, and the total hotspot data quantity is a sum of a hotspot data quantity in the high-speed physical hard disk and a hotspot data quantity in the capacity physical hard disk; based on this, the target migration threshold corresponding to the migration operation being determined based on the hotspot data distribution information may include, but is not limited to: if the total hotspot data quantity is greater than a preset first quantity threshold, an initial migration threshold configured (which may be configured according to experience and is not limited thereto) is increased to obtain the target migration threshold; or if the total hotspot data quantity is less than a preset second quantity threshold, an initial migration threshold is reduced to obtain the target migration threshold; or if the total hotspot data quantity is not greater than a preset first quantity threshold and is not less than a preset second quantity threshold, an initial migration threshold is determined as the target migration threshold.

In a possible implementation, the performing the garbage collection operation on the duplicated data in the capacity physical hard disk at the target time instant may include, but is not limited to: determining a band in which the duplicated data in the capacity physical hard disk is located, where the band includes multiple storage blocks, and the multiple storage blocks include a storage block with the duplicated data; if the multiple storage blocks further include a target storage block without the duplicated data, storing the user data within the target storage block into the capacity physical hard disk in the append manner; deleting the user data within each storage block (a storage block with the duplicated data and a target storage block without the duplicated data) in the band. In summary, it can be seen that the user data within the storage block with the duplicated data is not appended to the capacity physical hard disk, and the user data within the target storage block without the duplicated data is appended to the capacity physical hard disk.

It can be seen from the above technical solutions that, in an embodiment of the present application, a storage device includes a high-speed physical hard disk and a capacity physical hard disk, where the high-speed physical hard disk is a physical hard disk with fast read/write speed but small capacity, and the capacity physical hard disk is a physical hard disk with large capacity but slow read/write speed. In case of storage of user data, the user data is stored into the high-speed physical hard disk in an append manner, thereby meeting a fast-read/write storage need, that is, fast writing data and fast reading data can be supported. When the high-speed physical hard disk meets a migration condition, the user data in the high-speed physical hard disk is migrated to the capacity physical hard disk in the append manner, thereby meeting a large-capacity storage need, that is, a large quantity of user data can be stored at the same time through the capacity physical hard disk. A target time instant corresponding to a garbage collection operation can be determined, and the garbage collection operation can be performed on duplicated data in the capacity physical hard disk at the target time instant, so that the garbage collection operation can be performed at an appropriate time, which prevents the garbage collection operation from preempting a bandwidth of the data read operation, so that the capacity physical hard disk can meet a fast read/write need, rendering that a product need regarding a user read traffic can be met, avoiding the problem of traffic occupation and data loss caused by insufficient storage space, and ensuring that a user requirement is met in a high-traffic read-write mixed scenario, so that the storage device is in a stable state of dynamic balance.

The following describes the above technical solutions of the embodiments of the present application with reference to a specific application scenario.

Figure 3:
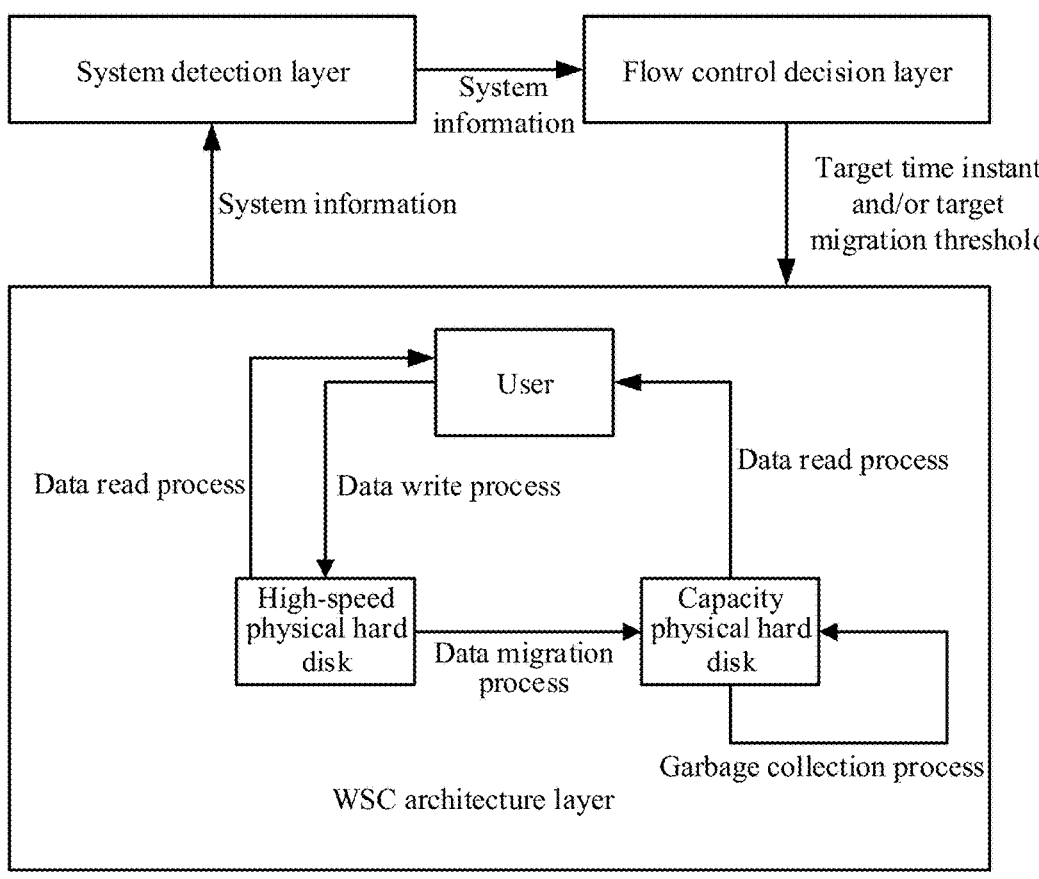
FIG. 3 is a schematic diagram of a data write process and a data read process in an implementation of the present application.

Referring to FIG. 3, the present application relates to a WSC architecture layer, a system detection layer, and a flow control decision layer.

Regarding the WSC architecture layer, it may involve a data write operation for a high-speed physical hard disk (e.g., writing user data into the high-speed physical hard disk), a data read operation for the high-speed physical hard disk (e.g., reading user data from the high-speed physical hard disk), a data write operation for a capacity physical hard disk (e.g., migrating user data from the high-speed physical hard disk to the capacity physical hard disk), a data read operation for the capacity physical hard disk (e.g., reading user data from the capacity physical hard disk), a garbage collection operation for the capacity physical hard disk (e.g., performing the garbage collection on duplicated user data in the capacity physical hard disk, that is, deleting the duplicated user data).

Regarding the system detection layer, the high-speed physical hard disk and the capacity physical hard disk may be detected to obtain system information, and the system information is provided to the flow control decision layer. The system information may include, but is not limited to, target decision information and/or hotspot data distribution information. Of course, the foregoing information is merely an example, and is not limited thereto.

Here, the target decision information may include, but is not limited to, at least one of the following: a remaining storage space of the capacity physical hard disk; a garbage ratio of the capacity physical hard disk; and a total IO quantity corresponding to each time period. Of course, the above descriptions are only a few examples of the target decision information, and the target decision information is not limited thereto.

Regarding the remaining storage space of the capacity physical hard disk, the system detection layer may periodically detect the remaining storage space of the capacity physical hard disk, that is, a size of an unoccupied storage space in the capacity physical hard disk. When the remaining storage space is larger, it means that the unoccupied storage space in the capacity physical hard disk is larger, that is, a storage space for storing new user data is larger; on the contrary, when the remaining storage space is smaller, it means that the unoccupied storage space in the capacity physical hard disk is smaller, that is, the storage space for storing the new user data is smaller.

Regarding the garbage ratio of the capacity physical hard disk, the system detection layer may periodically detect the garbage ratio of the capacity physical hard disk, that is, a ratio of a data quantity of duplicated data (the data quantity of the duplicated data in the capacity physical hard disk) to a total data quantity (the data quantity of all user data in the capacity physical hard disk). For example, assuming that the data quantity of the duplicated data in the capacity physical hard disk is k1 and the data quantity of all user data in the capacity physical hard disk is k2, the garbage ratio is k1/k2. When the garbage ratio is larger, it means that user data needing the garbage collection in the capacity physical hard disk is more, and the time for the garbage collection is longer; on the contrary, when the garbage ratio is smaller, it means that the user data needing the garbage collection in the capacity physical hard disk is less, and the time for the garbage collection is shorter.

Regarding a total IO quantity corresponding to each time period, a statistical cycle may be divided into a plurality of time periods, and the target decision information may include a total IO quantity corresponding to each time period. Here, for a total IO quantity corresponding to each time period, the total IO quantity may be, in the time period, a sum of a write operation quantity and a read operation quantity for the high-speed physical hard disk, and a read operation quantity for the capacity physical hard disk. The system detection layer may periodically detect the write operation quantity and the read operation quantity for the high-speed physical hard disk, and the read operation quantity for the capacity physical hard disk. Based on the above information, a total IO quantity corresponding to each time period may be determined.

For example, assuming that the statistical cycle is 24 hours, the statistical cycle may be divided into 24 time periods, and each time period corresponds to 1 hour. Of course, the statistical cycle may also be divided into 48 time periods, 12 time periods, etc., which is not limited thereto. In the following, time period 1 to time period 24 are taken as an example to describe.

For the time period 1, it can correspond to a total IO quantity p11 corresponding to the time period 1 of the statistical cycle 1 (e.g., the first day), a total IO quantity p12 corresponding to the time period 1 of the statistical cycle 2 (e.g., the second day), and so on. The total IO quantity p11 may be, in the time period 1 of the statistical cycle 1, the write operation quantity for the high-speed physical hard disk, plus the read operation quantity for the high-speed physical hard disk, plus the read operation quantity for the capacity physical hard disk, that is, a sum of the above three values. The total IO quantity p12 may be, in the time period 1 of the statistical cycle 2, the write operation quantity for the high-speed physical hard disk, plus the read operation quantity for the high-speed physical hard disk, plus the read operation quantity for the capacity physical hard disk, that is, a sum of the above three values, and so on.

In summary, the total IO quantity corresponding to the time period 1 may be obtained, such as the total IO quantity p11, the total IO quantity p12, etc. Similarly, total IO quantities corresponding to the time period 2 to the time period 24 may be obtained. So far, a total IO quantity corresponding to each time period may be obtained, and each time period may correspond to multiple total IO quantities.

Here, the hotspot data distribution information may include, but is not limited to, a total hotspot data quantity. Of course, the total hotspot data quantity is only an example of the hotspot data distribution information, and the hotspot data distribution information is not limited thereto.

Regarding the total hotspot data quantity, it may be a sum of a hotspot data quantity in the high-speed physical hard disk and a hotspot data quantity in the capacity physical hard disk. For example, the system detection layer may periodically detect the hotspot data quantity in the high-speed physical hard disk and the hotspot data quantity in the capacity physical hard disk, and based on the above two hotspot data quantities, the total hotspot data quantity may be determined. Here, hotspot data refers to user data on which a read/write operation is frequently performed. For example, for certain user data, if the number of times of a read operation and a write operation for the user data is greater than a preset threshold, the user data may be taken as the hotspot data.

Regarding the flow control decision layer, a target time instant corresponding to the garbage collection operation may be determined based on the system information, and then the WSC architecture layer is enabled to perform the garbage collection operation on the duplicated data in the capacity physical hard disk at the target time instant. For example, the target time instant corresponding to the garbage collection operation may be determined based on the target decision information. And/or, a target migration threshold corresponding to a migration operation may be determined based on the system information, and then the WSC architecture layer is enabled to migrate the user data in the high-speed physical hard disk to the capacity physical hard disk based on the target migration threshold. For example, the target migration threshold corresponding to the migration operation may be determined based on the hotspot data distribution information.

With reference to the application scenario shown in FIG. 3, description is made hereunder to the data write operation for the high-speed physical hard disk, the data read operation for the high-speed physical hard disk, the data write operation for the capacity physical hard disk, the data read operation for the capacity physical hard disk, and the garbage collection operation for the capacity physical hard disk.

First, regarding the data write operation for the high-speed physical hard disk, in connection with the data write operation, user data may be stored into the high-speed physical hard disk in an append manner, that is, the user data is additionally written after written data of the high-speed physical hard disk. After the user data is stored into the high-speed physical hard disk, a physical address of the user data in the high-speed physical hard disk may be further determined, a logical address corresponding to the user data may be also determined, and a mapping relationship between the logical address and the physical address may be recorded in the L2P table.

Here, the data write operation for the high-speed physical hard disk may be implemented by the WSC architecture layer.

Second, regarding the data write operation for the capacity physical hard disk, in connection with the data write operation, an initial migration threshold may be configured for the high-speed physical hard disk, which is also referred to as a basic migration level of the high-speed physical hard disk.

The system detection layer may acquire hotspot data distribution information corresponding to the high-speed physical hard disk, e.g., a total hotspot data quantity, where the total hotspot data quantity is a sum of a hotspot data quantity in the high-speed physical hard disk and a hotspot data quantity in the capacity physical hard disk, and send the total hotspot data quantity to the flow control decision layer.

After obtaining the total hotspot data quantity, the flow control decision layer may adjust the initial migration threshold based on the total hotspot data quantity to obtain a target migration threshold, where the target migration threshold may also be referred to as a target migration level, or a dynamic migration level, or an incremental migration level of the high-speed physical hard disk.

For example, if the total hotspot data quantity is greater than a preset first quantity threshold (which may be configured according to experience), the initial migration threshold is increased to obtain the target migration threshold. Here, when the total hotspot data quantity is greater than the preset first quantity threshold, it means that a hotspot distribution is relatively high, and a data failure rate is relatively high at this time. Therefore, the initial migration threshold may be increased, so that the basic migration level rises, thereby the data failure rate is reduced.

For another example, if the total hotspot data quantity is less than a preset second quantity threshold (which may be configured according to experience), the initial migration threshold is reduced to obtain the target migration threshold. Here, when the total hotspot data quantity is less than the preset second quantity threshold, it means that the hotspot distribution is relatively low, and the data failure rate is relatively low at this time. Therefore, the initial migration threshold may be reduced, so that the basic migration level drops, thereby the data migration operation is completed in time.

For another example, if the total hotspot data quantity is not greater than the preset first quantity threshold and is not less than the preset second quantity threshold, the initial migration threshold is determined as the target migration threshold. Here, when the total hotspot data quantity is not greater than the preset first quantity threshold and is not less than the preset second quantity threshold, it means that the hotspot distribution is relatively appropriate. Therefore, the initial migration threshold may be kept unchanged, so that the basic migration level is unchanged.

In the foregoing embodiment, the preset first quantity threshold may be greater than the preset second quantity threshold.

After obtaining the target migration threshold, the flow control decision layer may send the target migration threshold to the WSC architecture layer, and the data write operation for the capacity physical hard disk is implemented by the WSC architecture layer based on the target migration threshold.

Specifically, when a data quantity of user data in the high-speed physical hard disk reaches the target migration threshold (the target migration threshold is used to represent a data quantity threshold), it is determined that the high-speed physical hard disk meets a migration condition, and the user data in the high-speed physical hard disk (which may be all or part of the user data in the high-speed physical hard disk) is migrated to the capacity physical hard disk in an append manner. For example, for each piece of user data, after the user data is stored into the high-speed physical hard disk, it is determined whether the data quantity of the user data in the high-speed physical hard disk reaches the target migration threshold: if no, proceed with storage of new user data into the high-speed physical hard disk; if yes, the user data in the high-speed physical hard disk is migrated to the capacity physical hard disk in an append manner, and the migrated user data is deleted from the high-speed physical hard disk.

Here, after the user data in the high-speed physical hard disk is migrated to the capacity physical hard disk, it is also necessary to determine a physical address of the user data in the capacity physical hard disk, and update a physical address in the high-speed physical hard disk in an L2P table as the physical address in the capacity physical hard disk to obtain an updated L2P table.

Here, when the user data in the high-speed physical hard disk is migrated to the capacity physical hard disk in the append manner, a deduplication operation may be performed on the user data in the high-speed physical hard disk, and user data after the deduplication operation is migrated to the capacity physical hard disk. For example, since the user data is stored into the high-speed physical hard disk in the append manner, that is, there may be multiple pieces of duplicated user data in the high-speed physical hard disk. For the duplicated user data, during data migration, the user data after the deduplication operation needs to be migrated to the capacity physical hard disk. For example, the last piece of user data is migrated to the capacity physical hard disk, and the user data is deleted from the high-speed physical hard disk, and the remaining user data is directly deleted from the high-speed physical hard disk and is no longer migrated to the capacity physical hard disk.

Here, when the user data in the high-speed physical hard disk is migrated to the capacity physical hard disk in the append manner, the user data in the high-speed physical hard disk may be migrated to the capacity physical hard disk based on a granularity of a band (storage block area). For example, the band may include multiple storage blocks, and when user data migration is performed, multiple pieces of user data are migrated to the multiple storage blocks in the band at one time.

Third, regarding the data read operation for the high-speed physical hard disk and the data read operation for the capacity physical hard disk, in connection with the data read operation, a logical address corresponding to the user data may be determined, and an L2P table is queried through the logical address to obtain a physical address corresponding to the user data, and the user data is read based on the physical address. For example, if the physical address is a physical address in the high-speed physical hard disk, user data corresponding to the physical address is read from the high-speed physical hard disk based on a physical address queried in the L2P table. Alternatively, if the physical address is a physical address in the capacity physical hard disk, user data corresponding to the physical address is read from the capacity physical hard disk based on a physical address queried in the L2P table.

Here, the data read operation for the high-speed physical hard disk may be implemented by the WSC architecture layer, and the data read operation for the capacity physical hard disk may be implemented by the WSC architecture layer.

Fourth, regarding the garbage collection operation for the capacity physical hard disk, in connection with the garbage collection operation, target decision information may be acquired, a target time instant corresponding to the garbage collection operation may be determined based on the target decision information, and the garbage collection operation, i.e., GC operation, may be performed on duplicated data in the capacity physical hard disk at the target time instant.

The following describes the process of determining the "target time instant" through several specific manners.

Manner 1: the target decision information may include a remaining storage space of the capacity physical hard disk. For manner 1, an initial garbage collection threshold may be configured for the capacity physical hard disk, which is also referred to as a basic garbage collection level of the capacity physical hard disk. The system detection layer may acquire the remaining storage space of the capacity physical hard disk, and send the remaining storage space to the flow control decision layer. The flow control decision layer adjusts the initial garbage collection threshold based on the remaining storage space to obtain a target garbage collection threshold, and the target garbage collection threshold may also be referred to as a target garbage collection level, or a dynamic garbage collection level, or an incremental garbage collection level of the capacity physical hard disk.

For example, if the remaining storage space is less than a preset first storage space threshold (which may be configured according to experience), the initial garbage collection threshold is reduced to obtain the target garbage collection threshold. Here, when the remaining storage space is less than the preset first storage space threshold, it means that the remaining storage space is relatively small. Therefore, the initial garbage collection threshold is reduced, so that the basic garbage collection level drops, and more storage space is released, to prevent a sudden burst (i.e., IO traffic burst), that is, preventing the garbage collection operation from preempting a bandwidth during the IO traffic burst.

For another example, if the remaining storage space is greater than a preset second storage space threshold (which may be configured according to experience), the initial garbage collection threshold is increased to obtain the target garbage collection threshold. Here, when the remaining storage space is greater than the preset second storage space threshold, it means that the remaining storage space is relatively large. Therefore, the initial garbage collection threshold is increased, so that the basic garbage collection level rises, thereby frequency of the garbage collection operation can be reduced, which is beneficial for reducing the number of times of the garbage collection operation, thereby saving the bandwidth of the garbage collection operation.

For another example, if the remaining storage space is not less than the preset first storage space threshold and is not greater than the preset second storage space threshold, the initial garbage collection threshold is determined as the target garbage collection threshold. Here, when the remaining storage space is not less than the preset first storage space threshold and is not greater than the preset second storage space threshold, it means that the remaining storage space is relatively appropriate. Therefore, the initial garbage collection threshold may be kept unchanged, so that the basic garbage collection level is unchanged, that is, the initial garbage collection threshold is taken as the target garbage collection threshold.

In the foregoing embodiment, the preset first storage space threshold may be less than the preset second storage space threshold.

After obtaining the target garbage collection threshold, the flow control decision layer may send the target garbage collection threshold to the WSC architecture layer, and the target time instant corresponding to the garbage collection operation is determined by the WSC architecture layer based on the target garbage collection threshold. For example, a time instant at which a data quantity of duplicated data in the capacity physical hard disk reaches the target garbage collection threshold is determined, and the time instant is determined as the target time instant corresponding to the garbage collection operation.

For example, the data quantity of the duplicated data in the capacity physical hard disk may be periodically counted, and it may be determined whether the data quantity reaches the target garbage collection threshold. If no, the data quantity of the duplicated data in the capacity physical hard disk is continuously counted in a next cycle. If yes, the current time instant may be taken as the target time instant.

At the target time instant, the WSC architecture layer may perform the garbage collection operation on the duplicated data in the capacity physical hard disk, that is, perform a deduplication operation on duplicated user data in the capacity physical hard disk, keep user data after the deduplication operation in the capacity physical hard disk, and delete remaining user data from the capacity physical hard disk, e.g., keep the last piece of user data in the capacity physical hard disk, and delete the remaining user data.

Manner 2: the target decision information may include a garbage ratio of the capacity physical hard disk, where the garbage ratio represents a ratio of a data quantity of duplicated data to a total data quantity. For manner 2, an initial garbage collection threshold, also referred to as a basic garbage collection level, may be configured for the capacity physical hard disk. The system detection layer may acquire the garbage ratio of the capacity physical hard disk and send the garbage ratio to the flow control decision layer. The flow control decision layer adjusts the initial garbage collection threshold based on the garbage ratio to obtain a target garbage collection threshold of the capacity physical hard disk.

For example, if the garbage ratio is less than a preset first garbage ratio threshold (which may be configured according to experience), the initial garbage collection threshold is increased to obtain the target garbage collection threshold. Here, when the garbage ratio is less than the preset first garbage ratio threshold, it means that the garbage ratio is relatively low, that is, the duplicated data in the capacity physical hard disk is relatively little, and valid data in the capacity physical hard disk is relatively much. Therefore, the initial garbage collection threshold may be increased, so that the basic garbage collection level rises, thereby frequency of the garbage collection operation can be reduced, which is beneficial for reducing the number of times of the garbage collection operation, thereby saving a bandwidth of the garbage collection operation.

For another example, if the garbage ratio is greater than a preset second garbage ratio threshold (which may be configured according to experience), the initial garbage collection threshold is reduced to obtain the target garbage collection threshold. Here, when the garbage ratio is greater than the preset second garbage ratio threshold, it means that the garbage ratio is relatively high, that is, the duplicated data in the capacity physical hard disk is relatively much, and the valid data in the capacity physical hard disk is relatively little. Therefore, the initial garbage collection threshold may be reduced, so that the basic garbage collection level drops, and much storage space is released, to prevent a sudden burst (i.e., IO traffic burst), that is, preventing the garbage collection operation from preempting the bandwidth during the IO traffic burst.

For another example, if the garbage ratio is not less than the preset first garbage ratio threshold and is not greater than the preset second garbage ratio threshold, the initial garbage collection threshold is determined as the target garbage collection threshold. Here, when the garbage ratio is not less than the preset first garbage ratio threshold and is not greater than the preset second garbage ratio threshold, it means that the garbage ratio is appropriate. Therefore, the initial garbage collection threshold may be kept unchanged, so that the basic garbage collection level is unchanged.

In the above embodiment, the preset first garbage ratio threshold may be less than the preset second garbage ratio threshold.

After obtaining the target garbage collection threshold, the flow control decision layer may send the target garbage collection threshold to the WSC architecture layer, and the target time instant corresponding to the garbage collection operation is determined by the WSC architecture layer based on the target garbage collection threshold. For example, a time instant at which a data quantity of duplicated data in the capacity physical hard disk reaches the target garbage collection threshold is determined, and the time instant is determined as the target time instant corresponding to the garbage collection operation.

At the target time instant, the WSC architecture layer may perform the garbage collection operation on the duplicated data in the capacity physical hard disk, that is, perform a deduplication operation on duplicated user data in the capacity physical hard disk, keep user data after the deduplication operation in the capacity physical hard disk, and delete remaining user data from the capacity physical hard disk, e.g., keep the last piece of user data in the capacity physical hard disk, and delete the remaining user data.

Manner 3: the target decision information may include a total IO quantity corresponding to each time period, that is, a sum of a write operation quantity and a read operation quantity for the high-speed physical hard disk, and a read operation quantity for the capacity physical hard disk, such as a total IO quantity p11, and a total IO quantity p12, etc. corresponding to a time period 1, a total IO quantity p21, and a total IO quantity p22, etc. corresponding to a time period 2, . . . , and so on. For manner 3, the system detection layer may acquire a total IO quantity corresponding to each time period, and send a total IO quantity corresponding to each time period to the flow control decision layer. The flow control decision layer determines the target time period based on a total IO quantity corresponding to each time period.

Here, if a total IO quantity corresponding to a certain time period is greater than a preset IO quantity threshold, the time period may be taken as the target time period; otherwise, the time period is not taken as the target time period.

For example, for each time period, by taking the time period 1 as an example, a cycle quantity r may be determined, where r is a quantity threshold of periodic distribution. Assuming that the time period 1 corresponds to 100 total IO quantities, then r may be 100*s, where s may be configured according to experience, and is a value greater than 0 and less than or equal to 1, such as 0.7, 0.8, 0.9, etc. On this basis, if r total IO quantities corresponding to the time period 1 are all greater than the preset IO quantity threshold, it means that the total IO quantities of the time period 1 are of a periodic distribution, and the time period 1 is a large traffic time period. Therefore, the time period 1 is taken as the target time period. Otherwise, if r total IO quantities being all greater than the preset IO quantity threshold does not exist in the time period 1, it means that the total IO quantities of the time period 1 are not of a periodic distribution, and/or the time period 1 is not a large traffic time period. Therefore, the time period 1 is not taken as the target time period.

In summary, for each time period, it may be determined whether the time period is the target time period, and as for the target time period, it is a time period in which the total IO quantity is greater than the preset IO quantity threshold. After obtaining the target time period, the flow control decision layer may send the target time period to the WSC architecture layer, and the target time instant corresponding to the garbage collection operation is determined by the WSC architecture layer based on the target time period. For example, the target time instant may be before a start time instant of the target time period. For example, assuming that the garbage collection operation needs 100 seconds to complete, a difference value between the target time instant and the start time instant of the target time period may be greater than or equal to 100 seconds.

At the target time instant, the WSC architecture layer may perform the garbage collection operation on the duplicated data in the capacity physical hard disk, that is, perform a deduplication operation on duplicated user data in the capacity physical hard disk, keep user data after the deduplication operation in the capacity physical hard disk, and delete remaining user data from the capacity physical hard disk, e.g., keep the last piece of user data in the capacity physical hard disk, and delete the remaining user data.

Obviously, since the garbage collection operation is performed at the target time instant, the garbage collection operation can be completed before the target time period, thus completing the garbage collection operation in advance, and preventing the garbage collection operation from preempting a bandwidth against a large quantity of IOs. The above manner can also be called an implementation based on a user portrait, that is, identifying an IO pattern of a user, where the IO pattern is a total IO quantity corresponding to each time period. Based on the IO pattern, it can be known whether the total IO quantities are of a periodic distribution, and whether there is a large traffic time period, and then the target time period with a periodic distribution and a large traffic is found, thereby completing the garbage collection operation in advance and freeing up storage space.

Manner 1, manner 2, and manner 3 all involve the garbage collection operation on duplicated data in the capacity physical hard disk at the target time instant, this process includes: determining a band in which the duplicated data in the capacity physical hard disk is located, where the band includes multiple storage blocks, and the multiple storage blocks include a storage block with the duplicated data; if the multiple storage blocks further include a target storage block without the duplicated data, storing the user data within the target storage block into the capacity physical hard disk in the append manner; deleting the user data within each storage block in the band (a storage block with the duplicated data and a target storage block without the duplicated data).

For example, since the user data in the high-speed physical hard disk is migrated to the capacity physical hard disk in the append manner, multiple pieces of duplicated user data may be migrated to the capacity physical hard disk in multiple migration processes, that is, there may be multiple pieces of duplicated user data in the capacity physical hard disk, therefore, a deduplication operation may be performed on the duplicated user data. For example, the last piece of user data may be retained in the capacity physical hard disk (i.e., the deduplication operation is not performed on the last piece of user data), and the remaining user data is deleted from the capacity physical hard disk For the remaining user data, in order to delete the remaining user data from the capacity physical hard disk, the following manner may be adopted: determining a band in which the remaining user data is located, dividing the band into a storage block with the remaining user data and a target storage block without the remaining user data, and on this basis, storing user data within the target storage block into the capacity physical hard disk in an append manner, and deleting the user data within the target storage block, as well as deleting the remaining user data in the storage block directly.

The foregoing embodiment involves reducing the initial garbage collection threshold to obtain the target garbage collection threshold, e.g., subtracting a first adjustment value from the initial garbage collection threshold to obtain the target garbage collection threshold. As for the first adjustment value, it may be a value configured according to experience, or may be a value obtained by using a fuzzy control algorithm, which is not limited herein. The foregoing embodiment involves increasing the initial garbage collection threshold to obtain the target garbage collection threshold, e.g., adding a second adjustment value to the initial garbage collection threshold to obtain the target garbage collection threshold. As for the second adjustment value, it may be a value configured according to experience, or may be a value obtained by using a fuzzy control algorithm, which is not limited herein. The foregoing embodiment involves increasing the initial migration threshold to obtain the target migration threshold, e.g., adding a third adjustment value to the initial migration threshold to obtain the target migration threshold. As for the third adjustment value, it may be a value configured according to experience, or may be a value obtained by using a fuzzy control algorithm, which is not limited herein. The foregoing embodiment involves reducing the initial migration threshold to obtain the target migration threshold, e.g., subtracting a fourth adjustment value from the initial migration threshold to obtain the target migration threshold. As for the fourth adjustment value, it may be a value configured according to experience, or may be a value obtained by using a fuzzy control algorithm, which is not limited.

Figure 4:
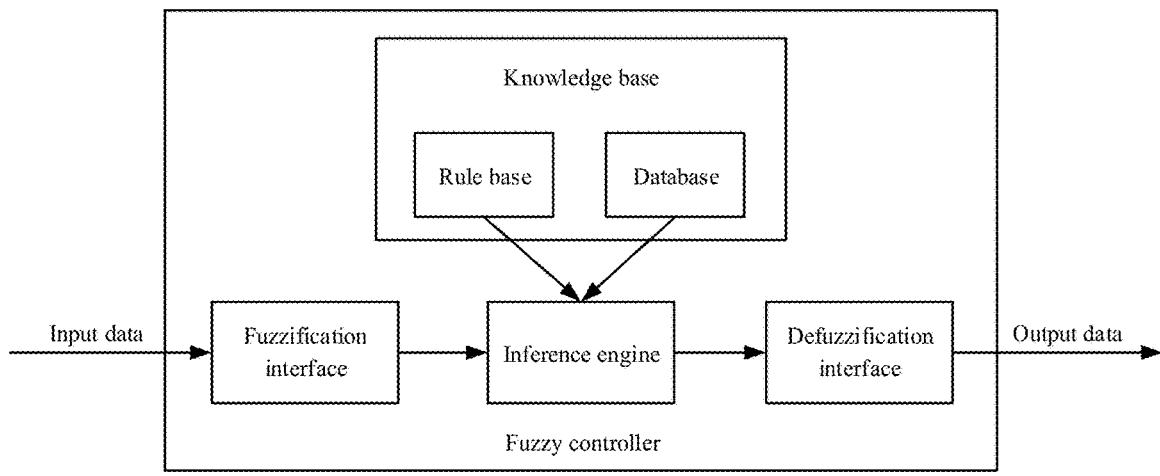
FIG. 4 is a schematic structure diagram of a fuzzy controller in an implementation of the present application.

When the fuzzy control algorithm is used to obtain the first adjustment value, the second adjustment value, the third adjustment value and the fourth adjustment value, a schematic structure diagram of a fuzzy controller may be referred to FIG. 4, which includes a fuzzification interface, an inference engine, a defuzzification interface and a knowledge base. The knowledge base includes a rule base and a database. The first adjustment value, the second adjustment value, the third adjustment value and the fourth adjustment value may be obtained through the fuzzy controller.

Obtaining the first adjustment value is taken as an example, a remaining storage space (or a garbage ratio) of the capacity physical hard disk may be taken as input data, the remaining storage space is input to the fuzzification interface, fuzzification processing is performed on the remaining storage space by the fuzzification interface, and the remaining storage space after the fuzzification processing is input to the inference engine.

The rule base is configured to provide the inference engine with the following inference policy: when the remaining storage space is less than a preset first storage space threshold, the initial garbage collection threshold is reduced; when the remaining storage space is greater than a preset second storage space threshold, the initial garbage collection threshold is increased; when the remaining storage space is not less than the preset first storage space threshold and is not greater than the preset second storage space threshold, and the initial garbage collection threshold is kept unchanged. The database is configured to provide the inference engine with the initial garbage collection threshold, the preset first storage space threshold, and the preset second storage space threshold.

Based on the inference policy, the initial garbage collection threshold, the preset first storage space threshold and the preset second storage space threshold, after obtaining the remaining storage space after the fuzzification processing, the inference engine may determine the first adjustment value, and subtract the first adjustment value from the initial garbage collection threshold, to obtain the target garbage collection threshold, and input the target garbage collection threshold to the defuzzification interface.

The defuzzification interface may perform defuzzification processing on the target garbage collection threshold, take the target garbage collection threshold after the defuzzification processing as output data, and output the target garbage collection threshold to the outside.

As for implementations of the second adjustment value, the third adjustment value, and the fourth adjustment value, they are similar to the implementation of the first adjustment value, and may all be implemented by the fuzzy controller, which is not repeated here.

It can be seen from the above technical solutions that, in the embodiments of the present application, the target time instant corresponding to the garbage collection operation can be determined, and the garbage collection operation can be performed on the duplicated data in the capacity physical hard disk at the target time instant, so that the garbage collection operation can be performed at the appropriate time, which prevents the garbage collection operation from preempting the bandwidth of the data read operation, so that the capacity physical hard disk can meet the fast read/write need, rendering that a product need regarding a user read traffic can be met, avoiding the problem of the traffic occupation and the data loss caused by the insufficient storage space, and ensuring that the user requirement is met in the high-traffic read-write mixed scenario, so that the storage device is in the stable state of the dynamic balance. The garbage collection operation does not affect the bandwidth occupied by the data read operation as much as possible, so that the bandwidth occupied by the data read operation is increased, and the need of the data read operation is met. The data read operation is completed in time, so that the garbage collection operation and the data read operation do not affect each other. An intelligent level algorithm based on the WSC architecture is proposed. Through adjusting a dynamic level threshold, the capacity physical hard disk can complete a garbage collection action at an appropriate time, so that a whole system is in the stable state of dynamic balance, rendering that a product need regarding a user read traffic can be met. For the user IO burst, a risk of the user data loss due to lack of storage space in the capacity physical hard disk is avoided, that is, by completing the user portrait, for a user sudden burst scenario, a garbage collection in advance frees up enough storage space.

Figure 5:
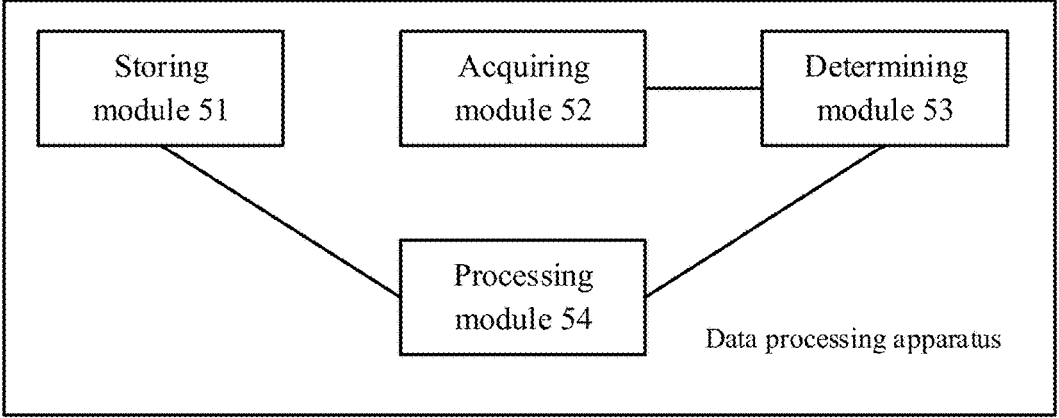
FIG. 5 is a schematic structure diagram of a data processing apparatus in an implementation of the present application.

Based on the same application concept as the above method, a data processing apparatus is provided in an embodiment of the present application, applied to a storage device, where the storage device includes a high-speed physical hard disk and a capacity physical hard disk. Reference is made to FIG. 5, which is a schematic structure diagram of the data processing apparatus. The apparatus may include:

a storing module 51, configured to store, after obtaining user data, the user data into the high-speed physical hard disk in an append manner; and migrate, when the high-speed physical hard disk meets a migration condition, the user data in the high-speed physical hard disk to the capacity physical hard disk in the append manner; an acquiring module 52, configured to acquire target decision information corresponding to the capacity physical hard disk; a determining module 53, configured to determine a target time instant corresponding to a garbage collection operation based on the target decision information; a processing module 54, configured to perform the garbage collection operation on duplicated data in the capacity physical hard disk at the target time instant.

Exemplarily, the determining module 53, when determining the target time instant corresponding to the garbage collection operation based on the target decision information, is specifically configured to: determine a target garbage collection threshold corresponding to the garbage collection operation based on the target decision information; determine a time instant at which a data quantity of the duplicated data in the capacity physical hard disk reaches the target garbage collection threshold, and determine the time instant as the target time instant corresponding to the garbage collection operation.

Exemplarily, the target decision information includes a remaining storage space of the capacity physical hard disk; the determining module 53, when determining the target garbage collection threshold corresponding to the garbage collection operation based on the target decision information, is specifically configured to: if the remaining storage space is less than a preset first storage space threshold, reduce an initial garbage collection threshold configured, to obtain the target garbage collection threshold; or if the remaining storage space is greater than a preset second storage space threshold, increase an initial garbage collection threshold, to obtain the target garbage collection threshold; or if the remaining storage space is not less than a preset first storage space threshold and is not greater than a preset second storage space threshold, determine an initial garbage collection threshold as the target garbage collection threshold.

Exemplarily, the target decision information includes a garbage ratio of the capacity physical hard disk, the garbage ratio representing a ratio of the data quantity of the duplicated data to a total data quantity; the determining module 53, when determining the target garbage collection threshold corresponding to the garbage collection operation based on the target decision information, is specifically configured to: if the garbage ratio is less than a preset first garbage ratio threshold, increase an initial garbage collection threshold configured, to obtain the target garbage collection threshold; or if the garbage ratio is greater than a preset second garbage ratio threshold, reduce an initial garbage collection threshold, to obtain the target garbage collection threshold; or if the garbage ratio is not less than a preset first garbage ratio threshold and is not greater than a preset second garbage ratio threshold, determine an initial garbage collection threshold as the target garbage collection threshold.

Exemplarily, a statistical cycle is divided into a plurality of time periods, and the target decision information includes a total IO quantity corresponding to each time period; for a total IO quantity corresponding to each time period, the total IO quantity is, in the time period, a sum of a write operation quantity and a read operation quantity for the high-speed physical hard disk, and a read operation quantity for the capacity physical hard disk; the determining module 53, when determining the target time instant corresponding to the garbage collection operation based on the target decision information, is specifically configured to: based on a total IO quantity corresponding to each time period, if the total IO quantity corresponding to the time period is greater than a preset IO quantity threshold, determine the target time instant corresponding to the garbage collection operation based on the time period; where the target time instant is before a start time instant of the time period.

Exemplarily, the storing module 51, when migrating, when the high-speed physical hard disk meets a migration condition, the user data in the high-speed physical hard disk to the capacity physical hard disk in the append manner, is specifically configured to: acquire hotspot data distribution information corresponding to the high-speed physical hard disk; determine a target migration threshold corresponding to a migration operation based on the hotspot data distribution information; when a data quantity of the user data in the high-speed physical hard disk reaches the target migration threshold, determine that the high-speed physical hard disk meets the migration condition, and migrate the user data in the high-speed physical hard disk to the capacity physical hard disk in the append manner.

Exemplarily, the hotspot data distribution information includes a total hotspot data quantity, and the total hotspot data quantity is a sum of a hotspot data quantity in the high-speed physical hard disk and a hotspot data quantity in the capacity physical hard disk; the storing module 51, when determining the target migration threshold corresponding to the migration operation based on the hotspot data distribution information, is specifically configured to: if the total hotspot data quantity is greater than a preset first quantity threshold, increase an initial migration threshold configured, to obtain the target migration threshold; or if the total hotspot data quantity is less than a preset second quantity threshold, reduce an initial migration threshold configured, to obtain the target migration threshold; or if the total hotspot data quantity is not greater than a preset first quantity threshold and is not less than a preset second quantity threshold, determine an initial migration threshold as the target migration threshold.

Exemplarily, the processing module 54, when performing the garbage collection operation on the duplicated data in the capacity physical hard disk at the target time instant, is specifically configured to: determine a band in which the duplicated data in the capacity physical hard disk is located, where the band includes multiple storage blocks, and the multiple storage blocks include a storage block with the duplicated data; if the multiple storage blocks further include a target storage block without the duplicated data, store the user data within the target storage block into the capacity physical hard disk in the append manner; delete the user data within each storage block in the band.

Figure 6:
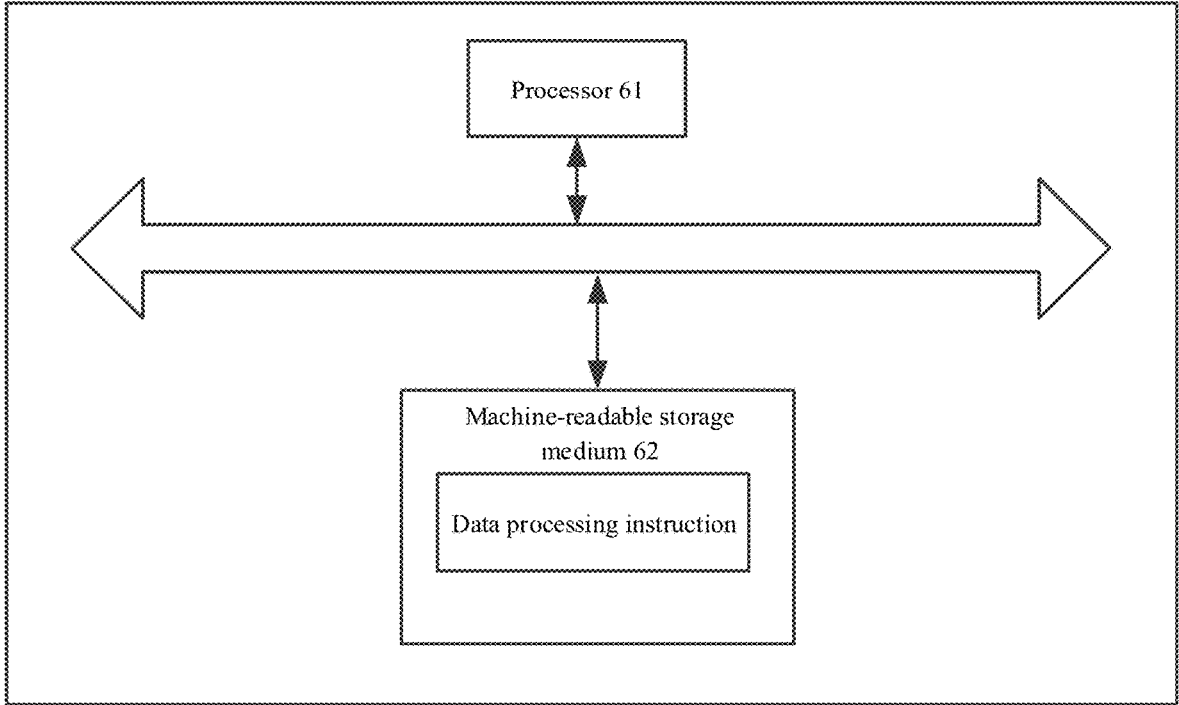
FIG. 6 is a hardware structure diagram of a storage device in an implementation of the present application.

Based on the same application concept as the above method, a storage device is provided in an embodiment of the present application. Referring to FIG. 6, the storage device, including: a processor 61 and a machine-readable storage medium 62, where the machine-readable storage medium 62 stores machine-executable instructions that can be executed by the processor 61; and the processor 61 is configured to execute the machine-executable instructions to implement the data processing method disclosed in the foregoing examples of the present application.

Based on the same application concept as the above method, a machine-readable storage medium is further provided in an embodiment of the present application, where the machine-readable storage medium stores machine-executable instructions that can be executed by a processor, and when the machine-executable instructions are executed by the processor, the data processing method disclosed in the foregoing examples of the present application can be implemented.

Here, the machine-readable storage medium may be any electronic, magnetic, optical, or other physical storage apparatus that may contain or store information, such as executable instructions, data, and the like. For example, the machine-readable storage medium may be: a RAM (Random Access Memory), a volatile memory, a non-volatile memory, a flash memory, a storage drive (e.g., hard drive), a solid state drive, any type of storage disks (such as optical discs, DVDs, etc.), or a similar storage medium, or a combination of them.

The system, apparatus, module, or unit illustrated in the foregoing embodiments may be specifically implemented by a computer chip or entity, or implemented by a product having a certain function. A typical implementation device is a computer, and the specific form of the computer may be a personal computer, a laptop computer, a cellular phone, a camera phone, a smart phone, a personal digital assistant, a media player, a navigation device, an email send/receive device, a game console, a tablet computer, a wearable device, or a combination of any of these devices.

A person skilled in the art should understand that the embodiments of the present application may be provided as a method, a system, or a computer program product. Therefore, the present application may take the form of an entirely hardware embodiment, an entirely software embodiment, or an embodiment combining software and hardware aspects. Moreover, the embodiments of the present application may take the form of the computer program product implemented on one or more computer-usable storage media (including but not limited to disk memory, CD-ROM (compact disc read-only memory), optical memory, etc.) including computer-usable program codes therein.

The present application is described with reference to flowcharts and/or block diagrams of methods, devices (systems), and computer program products according to the embodiments of the present application. It should be understood that each process and/or block in the flowcharts and/or block diagrams and combinations of processes and/or blocks in the flowcharts and/or block diagrams may be implemented by computer program instructions. These computer program instructions may be provided to a general-purpose computer, a dedicated computer, an embedded processor, or a processor of other programmable data processing device to generate a machine, so that instructions executed by the processor of the computer or other programmable data processing device generate apparatus for implementing functions specified in one or more flows of the flowcharts and/or one or more blocks of the block diagrams.

The above descriptions are merely embodiments of the present application, and are not intended to limit the present application. For those skilled in the art, the present application may have various modifications and changes. Any modification, equivalent replacement, improvement and the like made within the spirit and principle of the present application shall be included in the scope of the claims of the present application.

The invention claimed is:

1. A data processing method, applied to a storage device, wherein the storage device comprises a high-speed physical hard disk and a capacity physical hard disk, user data is stored into the high-speed physical hard disk in an append manner, and in response to the high-speed physical hard disk meeting a migration condition, the user data in the high-speed physical hard disk is migrated to the capacity physical hard disk in the append manner, the method comprising:

acquiring target decision information corresponding to the capacity physical hard disk;

determining, based on the target decision information, a target time instant corresponding to a garbage collection operation; and performing the garbage collection operation on duplicated data in the capacity physical hard disk at the target time instant;

wherein the determining, based on the target decision information, the target time instant corresponding to the garbage collection operation comprises:

determining, based on the target decision information, a target garbage collection threshold corresponding to the garbage collection operation; and determining a time instant at which a data quantity of the duplicated data in the capacity physical hard disk reaches the target garbage collection threshold, and determining the time instant as the target time instant corresponding to the garbage collection operation.

2. The method according to claim 1, wherein the target decision information comprises a remaining storage space of the capacity physical hard disk; and the determining, based on the target decision information, the target garbage collection threshold corresponding to the garbage collection operation comprises:

in response to the remaining storage space being less than a preset first storage space threshold, reducing an initial garbage collection threshold configured, to obtain the target garbage collection threshold; or in response to the remaining storage space being greater than a preset second storage space threshold, increasing an initial garbage collection threshold configured, to obtain the target garbage collection threshold; or in response to the remaining storage space not being less than a preset first storage space threshold and not being greater than a preset second storage space threshold, determining an initial garbage collection threshold as the target garbage collection threshold.

3. The method according to claim 1, wherein the target decision information comprises a garbage ratio of the capacity physical hard disk, the garbage ratio representing a ratio of the data quantity of the duplicated data to a total data quantity; and the determining, based on the target decision information, the target garbage collection threshold corresponding to the garbage collection operation comprises:

in response to the garbage ratio being less than a preset first garbage ratio threshold, increasing an initial garbage collection threshold configured, to obtain the target garbage collection threshold; or in response to the garbage ratio being greater than a preset second garbage ratio threshold, reducing an initial garbage collection threshold configured, to obtain the target garbage collection threshold; or in response to the garbage ratio not being less than a preset first garbage ratio threshold and not being greater than a preset second garbage ratio threshold, determining an initial garbage collection threshold as the target garbage collection threshold.

4. The method according to claim 1, wherein a statistical cycle is divided into a plurality of time periods, and the target decision information comprises a total input/output (IO) quantity corresponding to each time period;

wherein for the total IO quantity corresponding to each time period, the total IO quantity is, in each time period, a sum of a write operation quantity and a read operation quantity for the high-speed physical hard disk, and a read operation quantity for the capacity physical hard disk; and wherein the determining, based on the target decision information, the target time instant corresponding to the garbage collection operation comprises:

for each time period comprising a first time period, in response to the total IO quantity corresponding to the first time period being greater than a preset IO quantity threshold, determining, based on the first time period, the target time instant corresponding to the garbage collection operation;

wherein the target time instant is before a start time instant of the first time period.

5. The method according to claim 1, wherein in response to the high-speed physical hard disk meeting the migration condition, the user data in the high-speed physical hard disk being migrated to the capacity physical hard disk in the append manner comprises:

hotspot data distribution information corresponding to the high-speed physical hard disk being acquired;

a target migration threshold corresponding to a migration operation being determined based on the hotspot data distribution information; and in response to a data quantity of the user data in the high-speed physical hard disk reaching the target migration threshold, it being determined that the high-speed physical hard disk meets the migration condition, and the user data in the high-speed physical hard disk being migrated to the capacity physical hard disk in the append manner.

6. The method according to claim 5, wherein the hotspot data distribution information comprises a total hotspot data quantity, and the total hotspot data quantity is a sum of a hotspot data quantity in the high-speed physical hard disk and a hotspot data quantity in the capacity physical hard disk; and wherein the target migration threshold corresponding to the migration operation being determined based on the hotspot data distribution information comprises:

in response to the total hotspot data quantity being greater than a preset first quantity threshold, an initial migration threshold configured being increased to obtain the target migration threshold; or in response to the total hotspot data quantity being less than a preset second quantity threshold, an initial migration threshold configured being reduced to obtain the target migration threshold; or in response to the total hotspot data quantity not being greater than a preset first quantity threshold and not being less than a preset second quantity threshold, an initial migration threshold being determined as the target migration threshold.

7. The method according to claim 1, wherein the performing the garbage collection operation on the duplicated data in the capacity physical hard disk at the target time instant comprises:

determining a band in which the duplicated data in the capacity physical hard disk is located, wherein the band comprises a plurality of storage blocks, and the plurality of storage blocks comprise a storage block with the duplicated data; and in response to the plurality of storage blocks further comprising a target storage block without the duplicated data:

storing the user data within the target storage block into the capacity physical hard disk in the append manner; and deleting the user data within each storage block in the band.

8. The method according to claim 1, wherein the storage device stores the user data with use of a write shaping cache (WSC) architecture;

read/write speed of the high-speed physical hard disk is greater than a preset speed threshold, and storage capacity of the high-speed physical hard disk is less than a preset capacity threshold; read/write speed of the capacity physical hard disk is not greater than the preset speed threshold, and storage capacity of the capacity physical hard disk is not less than the preset capacity threshold.

9. A storage device, wherein the storage device comprises a high-speed physical hard disk and a capacity physical hard disk, and the storage device comprise a processor and a non-transitory machine-readable storage medium, wherein the machine-readable storage medium stores machine-executable instructions capable of being executed by the processor; and the processor is configured to execute the machine-executable instructions to:

store, after obtaining user data, the user data into the high-speed physical hard disk in an append manner; and migrate, when the high-speed physical hard disk meets a migration condition, the user data in the high-speed physical hard disk to the capacity physical hard disk in the append manner;

acquire target decision information corresponding to the capacity physical hard disk;

determine, based on the target decision information, a target time instant corresponding to a garbage collection operation; and perform the garbage collection operation on duplicated data in the capacity physical hard disk at the target time instant;

wherein the processor is specifically configured to:

determine, based on the target decision information, a target garbage collection threshold corresponding to the garbage collection operation; and determine a time instant at which a data quantity of the duplicated data in the capacity physical hard disk reaches the target garbage collection threshold, and determine the time instant as the target time instant corresponding to the garbage collection operation.

10. The storage device according to claim 9, wherein a statistical cycle is divided into a plurality of time periods, and the target decision information comprises a total input/output (IO) quantity corresponding to each time period;

wherein for the total IO quantity corresponding to each time period, the total IO quantity is, in each time period, a sum of a write operation quantity and a read operation quantity for the high-speed physical hard disk, and a read operation quantity for the capacity physical hard disk; and the processor is configured to:

for each time period comprising a first time period, if the total IO quantity corresponding to the first time period is greater than a preset IO quantity threshold, determine, based on the first time period, the target time instant corresponding to the garbage collection operation;

wherein the target time instant is before a start time instant of the first time period.

11. The storage device according to claim 9, wherein when the high-speed physical hard disk meets the migration condition, the processor is configured to:

acquire hotspot data distribution information corresponding to the high-speed physical hard disk;

determine, based on the hotspot data distribution information, a target migration threshold corresponding to a migration operation; and when a data quantity of the user data in the high-speed physical hard disk reaches the target migration threshold, determine that the high-speed physical hard disk meets the migration condition, and migrate the user data in the high-speed physical hard disk to the capacity physical hard disk in the append manner.

12. The storage device according to claim 11, wherein the hotspot data distribution information comprises a total hotspot data quantity, and the total hotspot data quantity is a sum of a hotspot data quantity in the high-speed physical hard disk and a hotspot data quantity in the capacity physical hard disk; and the processor is configured to:

if the total hotspot data quantity is greater than a preset first quantity threshold, increase an initial migration threshold configured, to obtain the target migration threshold; or if the total hotspot data quantity is less than a preset second quantity threshold, reduce an initial migration threshold configured, to obtain the target migration threshold; or if the total hotspot data quantity is not greater than a preset first quantity threshold and is not less than a preset second quantity threshold, determine an initial migration threshold as the target migration threshold.

13. The storage device according to claim 9, wherein the processor is configured to:

determine a band in which the duplicated data in the capacity physical hard disk is located, wherein the band comprises a plurality of storage blocks, and the plurality of storage blocks comprise a storage block with the duplicated data; and if the plurality of storage blocks further comprise a target storage block without the duplicated data:

store the user data within the target storage block into the capacity physical hard disk in the append manner; and delete the user data within each storage block in the band.

14. The storage device according to claim 9, wherein the storage device stores the user data with use of a write shaping cache (WSC) architecture;

read/write speed of the high-speed physical hard disk is greater than a preset speed threshold, and storage capacity of the high-speed physical hard disk is less than a preset capacity threshold; read/write speed of the capacity physical hard disk is not greater than the preset speed threshold, and storage capacity of the capacity physical hard disk is not less than the preset capacity threshold.

15. A non-transitory machine-readable storage medium storing machine-executable instructions capable of being executed by a processor, wherein the processor is configured to execute the machine-executable instructions to implement the following operations:

acquiring target decision information corresponding to a capacity physical hard disk;

determining, based on the target decision information, a target time instant corresponding to a garbage collection operation; and performing the garbage collection operation on duplicated data in the capacity physical hard disk at the target time instant;

wherein the operations are applied to a storage device, the storage device comprises a high-speed physical hard disk and the capacity physical hard disk, user data is stored into the high-speed physical hard disk in an append manner, and when the high-speed physical hard disk meets a migration condition, the user data in the high-speed physical hard disk is migrated to the capacity physical hard disk in the append manner;

wherein the determining, based on the target decision information, the target time instant corresponding to the garbage collection operation comprises:

determining, based on the target decision information, a target garbage collection threshold corresponding to the garbage collection operation; and determining a time instant at which a data quantity of the duplicated data in the capacity physical hard disk reaches the target garbage collection threshold, and determining the time instant as the target time instant corresponding to the garbage collection operation.

16. The storage device according to claim 9, wherein the target decision information comprises a remaining storage space of the capacity physical hard disk; and the processor is configured to:

if the remaining storage space is less than a preset first storage space threshold, reduce an initial garbage collection threshold configured, to obtain the target garbage collection threshold; or if the remaining storage space is greater than a preset second storage space threshold, increase an initial garbage collection threshold configured, to obtain the target garbage collection threshold; or if the remaining storage space is not less than a preset first storage space threshold and is not greater than a preset second storage space threshold, determine an initial garbage collection threshold as the target garbage collection threshold.

17. The storage device according to claim 9, wherein the target decision information comprises a garbage ratio of the capacity physical hard disk, the garbage ratio representing a ratio of the data quantity of the duplicated data to a total data quantity; and the processor is configured to:

if the garbage ratio is less than a preset first garbage ratio threshold, increase an initial garbage collection threshold configured, to obtain the target garbage collection threshold; or if the garbage ratio is greater than a preset second garbage ratio threshold, reduce an initial garbage collection threshold configured, to obtain the target garbage collection threshold; or if the garbage ratio is not less than a preset first garbage ratio threshold and is not greater than a preset second garbage ratio threshold, determine an initial garbage collection threshold as the target garbage collection threshold.

* * * * *